Figure 1:
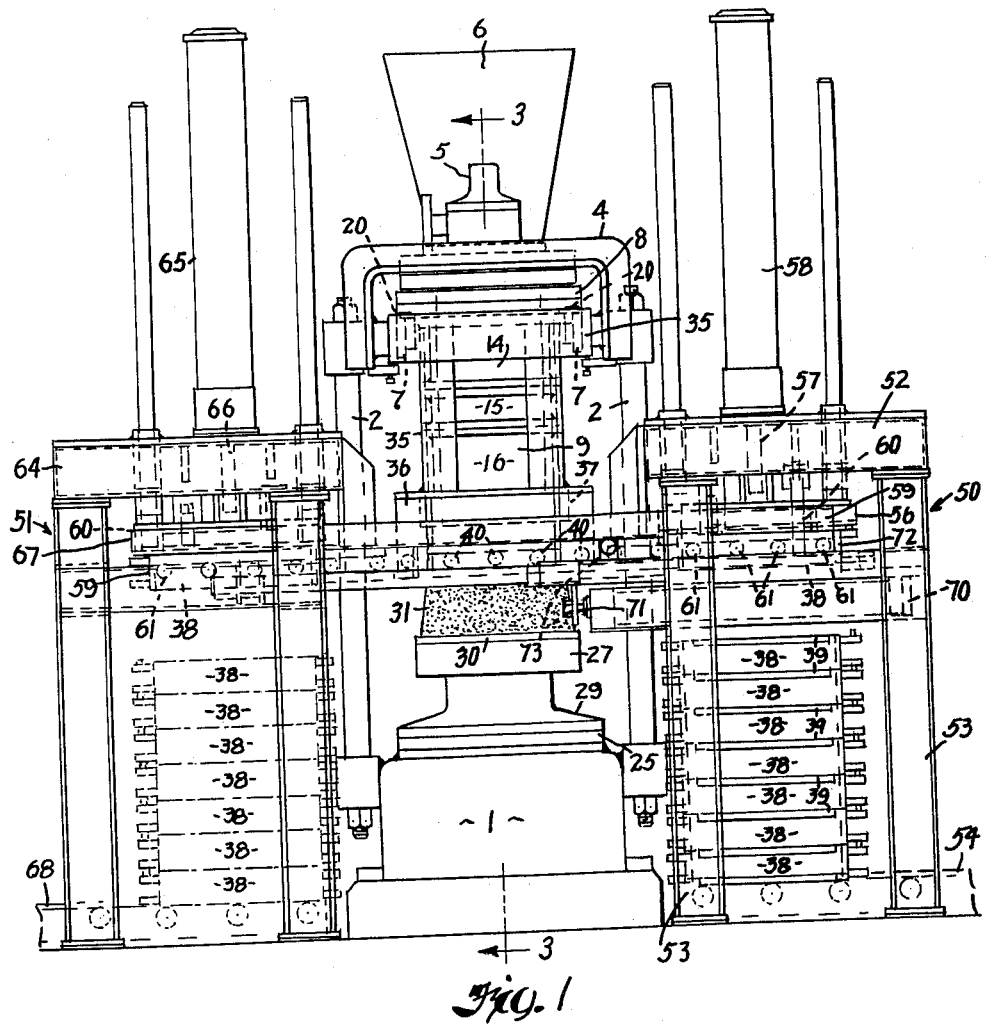

June 6, 1961  L. F. MILLER ET AL  2,986,785
BLOW AND SQUEEZE MOLDING METHOD
Original Filed July 18, 1957  7 Sheets-Sheet 1

INVENTORS
LEON F. MILLER AND
EDMOND K. HATCH
BY Oberlin, Maky, & Donnelly
ATTORNEYS.

INVENTORS
LEON F. MILLER AND
EDMOND K. HATCH.
BY
Oberlin, Maky, & Donnelly
ATTORNEYS.

INVENTORS
LEON F. MILLER AND
BY EDMOND K. HATCH

Oberlin, Maky, & Donnelly
ATTORNEYS.

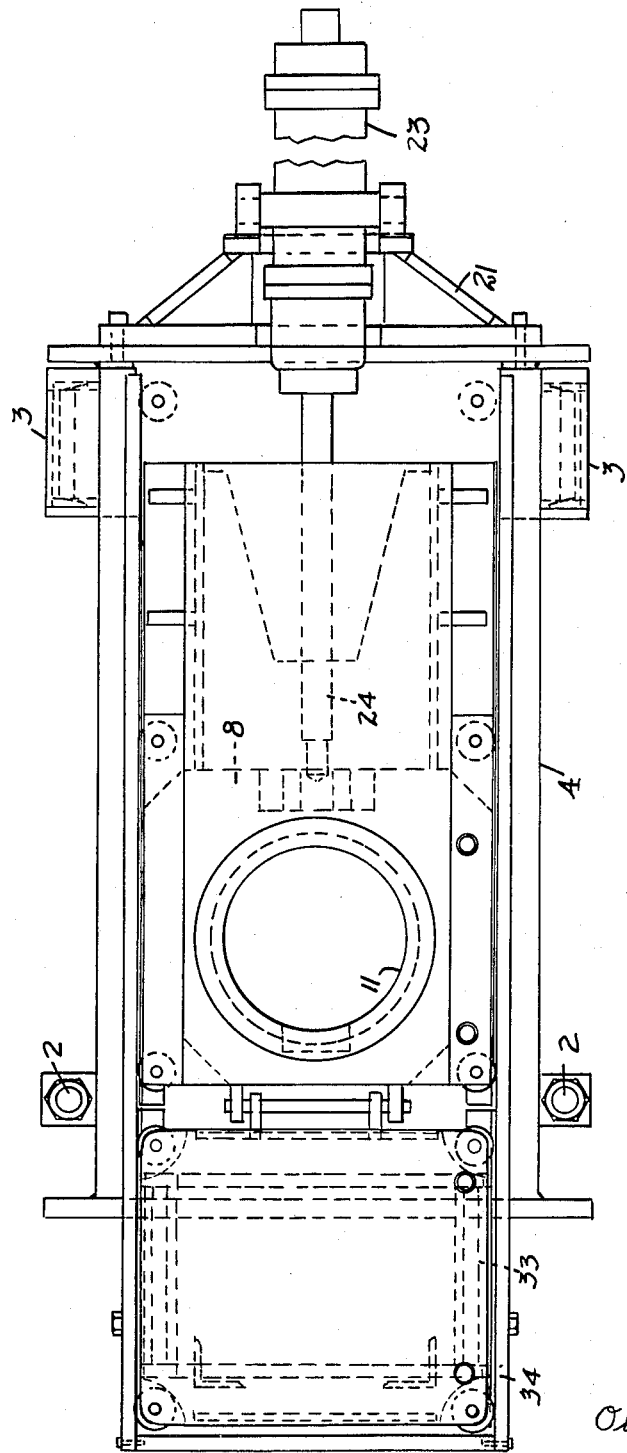

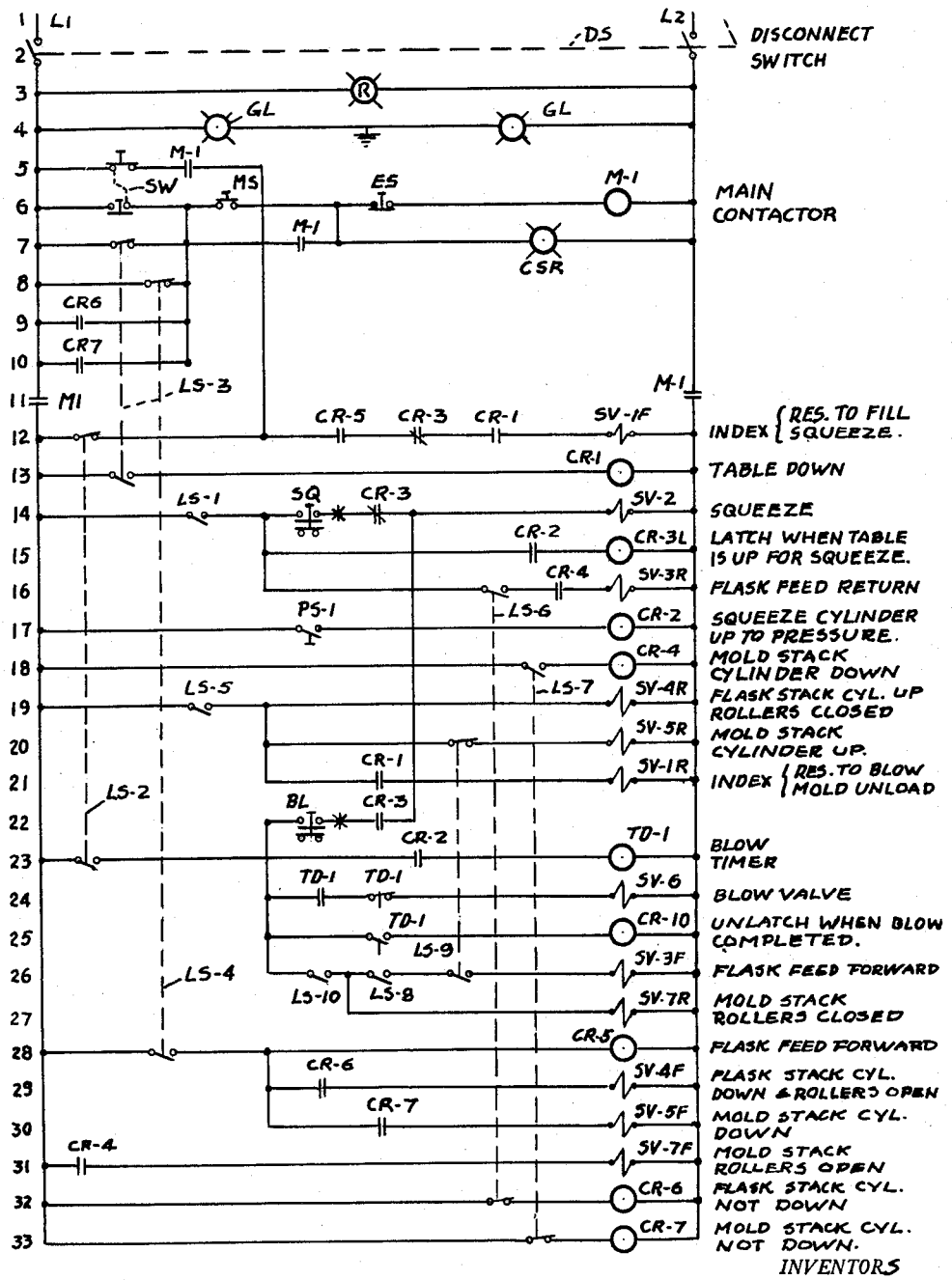

United States Patent Office 2,986,785
Patented June 6, 1961

2,986,785
BLOW AND SQUEEZE MOLDING METHOD
Leon F. Miller, Rocky River, and Edmond K. Hatch, Warrensville Heights, Ohio, assignors to The Osborn Manufacturing Company, Cleveland, Ohio, a corporation of Ohio
Original application July 18, 1957, Ser. No. 672,640, now Patent No. 2,908,950, dated Oct. 20, 1959. Divided and this application Dec. 24, 1958, Ser. No. 782,696
6 Claims. (Cl. 22—197)

The present invention relates generally, as indicated, to a blow and squeeze molding method and more particularly to a method for efficiently carrying out a foundry molding process such as disclosed in the copending application of Leon F. Miller, Serial No. 520,714, filed July 8, 1955, now Pat. No. 2,866,242, dated December 30, 1958, wherein particulate mold material, such as foundry sand, for example, is blown into a mold box to form a mold therein, and wherein the molded sand body is squeezed to final form against a pattern while encompassed by a flask or the like.

This application is a division of our copending application Ser. No. 672,640, filed July 18, 1957, now Pat. No. 2,908,950, dated October 20, 1959.

It has been, and is, conventional foundry practice to make molds by loading sand into a flask resting on a pattern plate and tamping or squeezing the sand in said flask against the pattern on said plate, such method leaving much to be desired with reference to surface finish of the mold cavity and also with reference to imperfections, soft spots, and the like encountered with intricate patterns that have undercuts, flanges, radially extending bosses, etc. To some degree, at least, such defects may be traced to the inability of the sand to flow into and to fill the undercuts, etc. when merely subjected to the tamping, jolting, or squeezing operations.

On the other hand, it is known in the art that smooth, hard-surfaced cavities may be formed in conformance even with intricate pattern shapes by employing a so-called "core blowing machine" wherein foundry sand is blown into a core box under the influence of high pressure air from a blow head, which air has the effect of fluidizing the sand so that it will readily flow into intimate contact with the surfaces of the pattern disposed in said core box. For a complete description of such core blowing equipment, reference may be had to the Ellms Pat. No. 2,545,944, granted March 2, 1951. However, for foundry molds it is preferred, or necessary, to provide a denser compacted body of sand for backing up the mold surfaces than can be achieved by employing the mold blowing equipment.

Accordingly, it is a principal object of this invention to provide a novel method for producing high quality foundry molds by combining mold blowing and squeezing techniques.

It is another object of this invention to provide a blow and squeeze molding method which successively blows the mold material against a pattern and squeezes the blown mold in a surrounding flask or the like.

It is yet another object of this invention to provide a blow and squeeze molding method which is characterized in that an elevatable pattern plate support table and a blow head thereabove are each employed for the blow and squeeze operations, a mold box being interposed between said table and said head whereby sand is blown into said mold box under the influence of fluid under pressure from said blow head, and a mold squeezing ram being interposed between said head and table for the performance of the squeezing operation.

It is still another object of this invention to provide a method of the character indicated which utilizes a novel mold box and flask carrier which selectively positions a mold box and a flask for forming a blown mold in said box and for squeezing a blown mold while encompassed by said flask.

It is still another object of this invention to provide a method of the character indicated by which mold material is automatically blown against a pattern while confined in a mold box, the blown mold and pattern is drawn from said box, and the blown mold is squeezed against said pattern while encompassed by a flask or the like.

It is still another object of this invention to provide a method of the character indicated which is adapted for use in making molds for so-called "stack molding" in which a plurality of flasks containing the blown and squeezed mold therein are stacked and provided with intercommunicating sprues and with gates that lead from said sprue to the respective mold cavities of the stacked flasks. Of course, the machine herein may be used to make series of molds which, respectively, constitute copes and drags of subsequently assembled foundry molds.

Yet another object of this invention is to provide a blow and squeeze molding method that utilizes a novel technique of unloading and loading for stacking the flasks with squeezed molds therein and for supplying empty flasks from a stack.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

Figure 2:
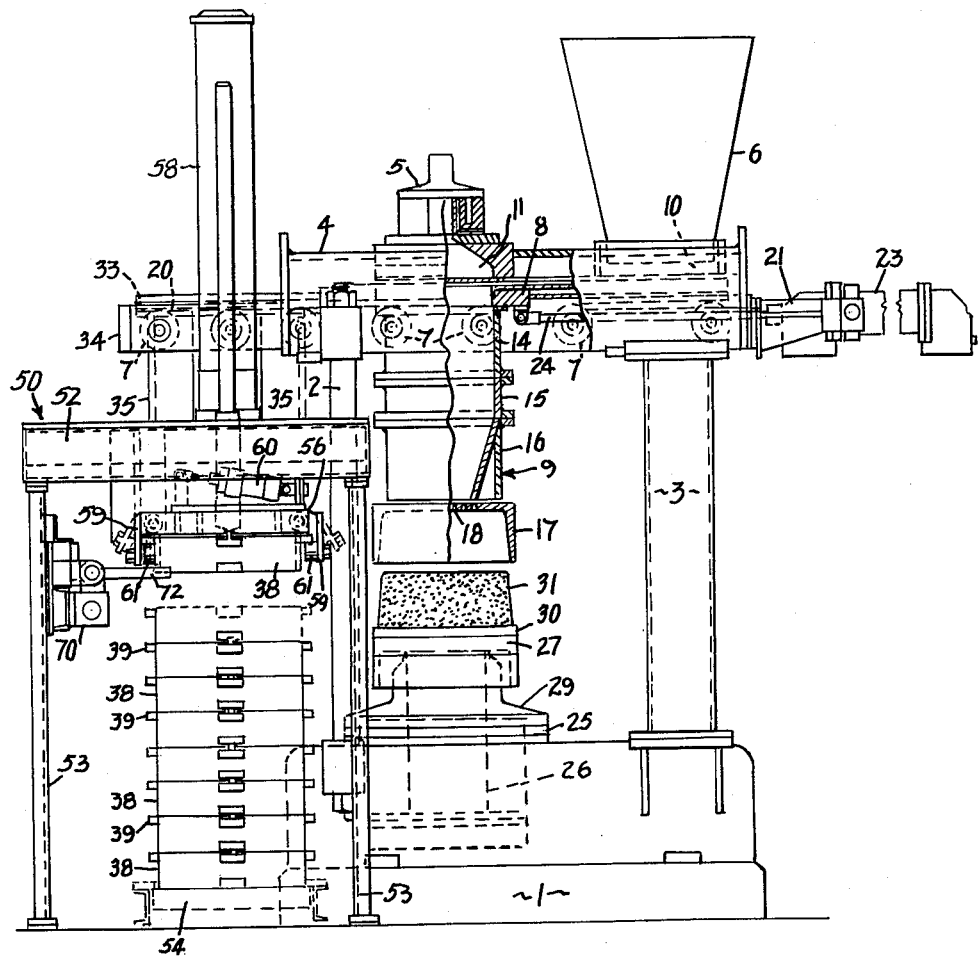
Figure 3:
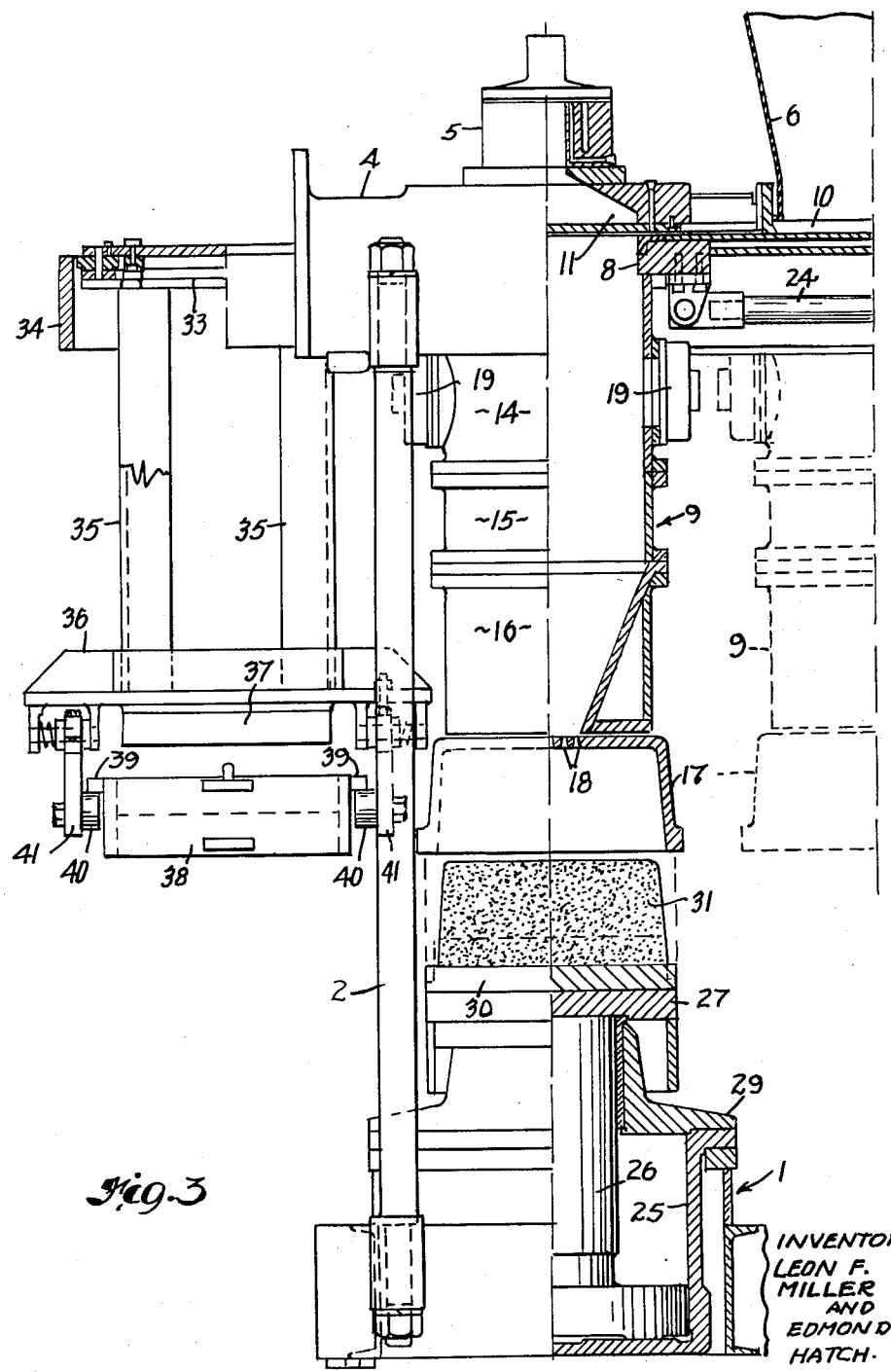
Figure 4:
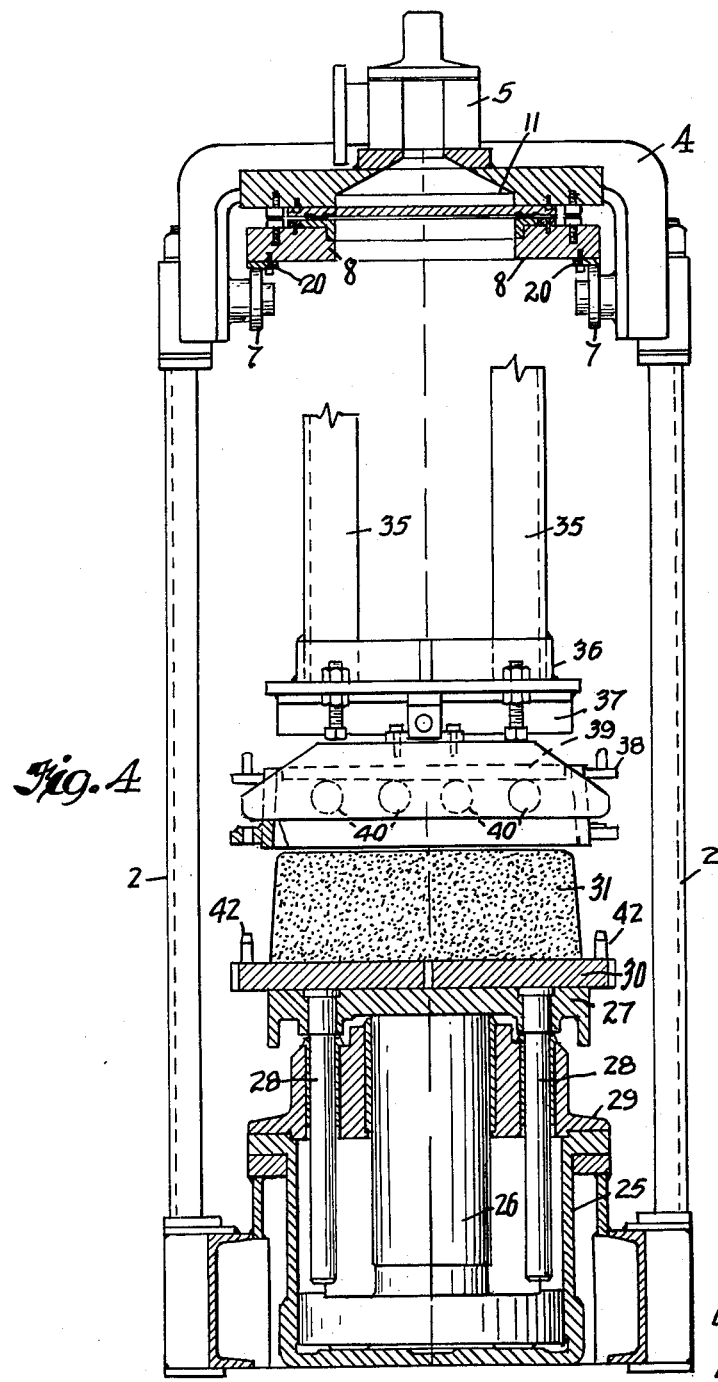
Figure 5:
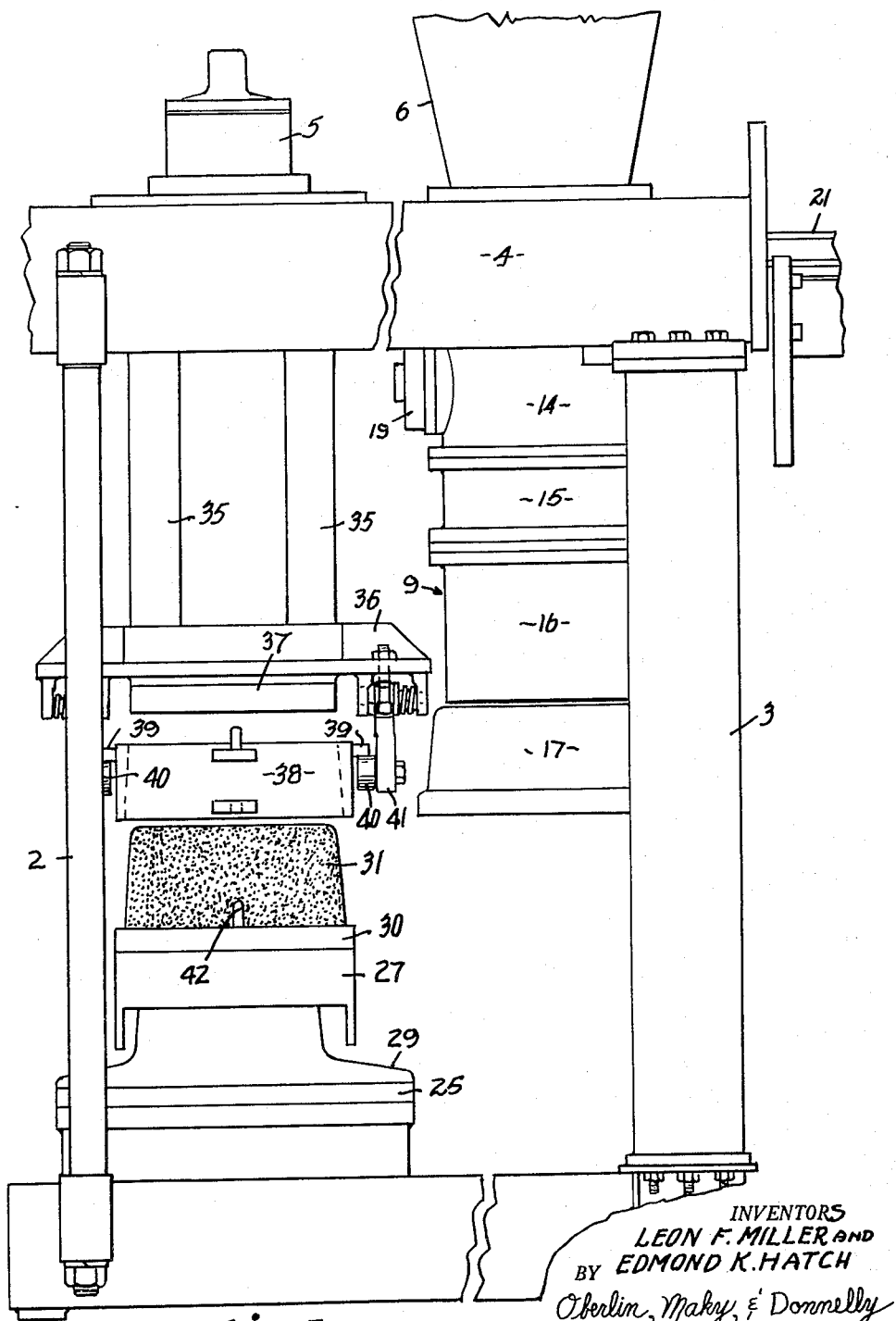

In said annexed drawings:
FIG. 1 is a front elevation view of a preferred form of blow and squeeze molding machine embodying the principles of this invention;
FIG. 2 is a side elevation view of said blow and squeeze molding machine as viewed from the right-hand side of FIG. 1;
FIG. 3 is a fragmentary elevation view, partly in cross-section, of the blow and squeeze molding machine proper as viewed substantially along the line 3—3, FIG. 1, and showing the machine parts in the positions they assume after the blown mold has been formed and drawn from the mold box;
FIG. 4 is an elevation view, partly in cross-section, as viewed from the left-hand side of FIG. 3;
FIG. 5 is an elevation view generally similar to FIG. 3, except showing an empty mold flask in register with the blown mold and pattern just prior to insertion of said blown mold into said flask for squeezing against the pattern;
FIG. 6 is a top plan view of the present machine, the blow head and sand hopper having been omitted for sake of clarity; and,
FIG. 7 is a schematic wiring diagram by which automatic operation of the machine is accomplished.

(1) *The blow and squeeze molding machine*

Referring now more particularly to the drawings and first to FIGS. 1 and 2, the frame of the machine herein generally resembles that disclosed in the aforesaid Ellms patent and comprises a rugged base 1 to which are secured the lower ends of a plurality of upstanding tie rods 2; 2 and 3; 3. The upper ends of said tie rods have secured thereto a blow head 4 provided with a blow valve 5 and a sand hopper 6.

Said blow head 4, as herein shown, is of generally channel-shaped form, of which the opposite down-turned sides are equipped with rollers 7 serving to guide the slide 8 of the sand reservoir 9 for reciprocatory movement between positions wherein its upper open end registers with the opening 10 communicating with the sand hopper 6 and with the opening 11 communicating with the air pressure outlet of the blow valve 5.

As best shown in FIG. 3, the sand reservoir 9 comprises a series of tubular sections 14, 15, and 16 that may be secured together by screws, by welding or other expedient, the bottom section 16 preferably being of funnel-shape internally and having secured thereunder a preform or mold box 17 having a plurality of relatively small size openings 18 through which sand in said reservoir 9 may be blown into said mold box 17 when the blow valve 5 is opened. Said sand reservoir 9 may be provided with air exhaust valves 19, such as are disclosed in said Ellms patent, for the purpose of releasing the air pressure from said reservoir 9 after the blowing operation has been completed.

The slide 8 is provided with parallel tracks 20 that are engaged with the rollers 7 whereby said slide 8 and sand reservoir 9 suspended therefrom, when shifted to the position shown in FIG. 5 register with the sand hopper 6 whereby sand is loaded into said reservoir 9 and when in the position shown in FIGS. 2 and 3, register with the blow valve 5 so that sand will be discharged from said reservoir 9 into said mold box 17 under the influence of high pressure air entering through the blow head opening 11.

The blow head 4 is provided with a rearwardly extending bracket 21 to which a double acting cylinder 23 is mounted, the piston rod 24 thereof being linked, as shown, to the slide 8 at the top of said sand reservoir for moving said slide 8 back and forth as aforesaid.

The base 1 of the machine mounts a vertically disposed fluid cylinder 25 in coaxial relation with the blow valve 5 and opening 11 in blow head 4, the piston 26 thereof engaging under the table 27 to raise and lower the latter. Said table 27 may be provided with guide rods 28 which are slidable in bushed openings formed in the cylinder head 29.

On said table 27 is a pattern plate 30 which carries a pattern (not shown) thereon.

When fluid under pressure is admitted into cylinder 25 beneath the piston 26, the latter is moved upwardly, as is the table 27 and the pattern plate 30 thereon. As said table 27 and pattern plate 30 thus move upwardly, the upper surface of said plate 30 engages the bottom rim of said mold box 17, the resulting lifting action on slide 8 effecting an air-tight seal around the opening 11. The engagement of said pattern plate 30 with mold box 17, as just described, establishes an air-tight seal at that point. With the parts thus positioned, the blow head valve 5 may be opened to allow high pressure air to flow into the sand reservoir 9, the exhaust valves 19 being closed at that time, whereupon the high pressure air percolates through the sand to fluidize the same and to force the same through the apertures 18 into the sand-receiving chamber that is defined between the pattern plate 30 and the inside walls of said mold box 17.

Such blowing in of the sand under the influence of the high pressure air causes the sand to flow into intimate contact with the pattern irrespective of the intricacy thereof and especially into undercuts, grooves, lugs, and the like. Such blowing results in the formation of a mold 31 whose pattern contacting surfaces are hard, uniform, and smooth.

After the sand has thus been blown against the pattern on pattern plate 30 to form a mold 31, the fluid under piston 26 is vented or released whereupon said piston 26, table 27, pattern plate 30, and mold 31 descend as a unit with respect to the mold box 17. These parts are shown in such lowered position in FIGS. 1, 2, and 3, wherein said mold 31 has been drawn down out of said mold box 17.

The slide 8 of the sand reservoir 9 has linked thereto (see FIG. 6) a flask carrier slide 33 which is supported on rollers 7 in the extension 34 of the blow head 4. Said flask carrier slide 34 has a plurality of downwardly extending rods 35 to the lower ends of which a flask support head 36 is secured, said head having a downwardly projecting boss 37 which, as hereinafter explained, constitutes a ram or squeezing head against which the mold 31 is squeezed while encompassed by an empty flask 38. The empty flask 38 may be of familiar form having ribs or flanges 39 along its opposite sides under which the rollers 40 on arms 41 of head 36 are engaged.

When the sand reservoir 9 is retracted to the FIG. 5 position, the empty flask 38 will be positioned coaxially above the mold 31, whereupon the piston 26 again may be actuated upwardly to raise the table 27, the pattern plate 30 and the mold 31 thereon. Pattern plate 30 has locating pins 42 which fit in holes formed in flask 38. At about the time the top of the mold 31 contacts the bottom of the boss 37 or shortly therebefore, the peripheral portion of the pattern plate 30 engages the bottom edge of the flask 38 and as the upward movement continues the flask 38 is raised with respect to the supporting rolls 40 and the mold 31 is squeezed as table 27, pattern plate 30, and flask 38 continue to ascend with respect to said boss 37. It can be seen that the support rods 35 constitute compression rods with the upper slide 33 bearing against the fixed blow head 4 of the machine. Preferably, the mold 31 is squeezed to a thickness corresponding to the height of the surrounding flask 38.

Now, when the piston 26 and table 27 are allowed to descend, the pattern on pattern plate 30 will be drawn out of the flask 38 leaving therein the squeezed mold 31.

During the aforesaid mold squeezing operation, the upper open end of the sand reservoir 9 was in register with the sand hopper opening 10 to fill said reservoir preparatory to forming the next blown mold 31.

When the completed blown and squeezed mold 31 inside flask 38 has been shifted to the FIG. 3 position it may be removed from the transfer mechanism and the next empty flask 38 placed on rollers 40.

*(II) The flask unloading (stacking) and loading mechanisms*

In order to minimize manual labor and to facilitate the transport of flasks 38 to and from the flask carrier 36, there is disposed on either side and forwardly of the base 1 a loading mechanism 50 and an unloading mechanism 51 alinged with the flask carrier 36 and slide 33 when the latter is in its forward inoperative position.

The loading mechanism 50 comprises a platform 52 supported at the upper ends of posts 53 and disposed between said posts is a suitable conveyor 54 on which a stack of empty flasks 38 may be positioned underneath said platform 52.

The flask pickup head 56 is carried by the lower end of a piston 57 which is vertically reciprocable in the fluid cylinder 58 mounted on said platform, said head 56 being provided with swingable roller-equipped arms 59 on opposite sides which are swung out and in as by means of the double-acting fluid cylinder 60. Thus, when the said pickup head 56 is moved downwardly with said arms 59 swing outwardly as shown by dotted lines in FIG. 2, said head engages the top one of the stack of empty flasks 38 where by actuation of cylinder 60 to swing the arms 59 inwardly the rollers 61 are engaged under the ribs or flanges 39 of said top flask 38. The pickup head 56, when raised, lifts the top flask 38 to the same level as the rollers 40 of the flask carrier 36.

The unloading or flask stacking structure 51 is generally similar to the loading structure in that it also comprises a platform 64 having a vertical fluid cylinder 65 to the piston 66 of which is secured a flask lowering or stacking head 67 provided with similar swinging arms 59 and rollers 61 thereon and an actuating cylinder 60. Thus, the lowering head 67 when at the same elevation as the flask carrier 36, can receive the flask 38 and squeezed mold 31 therein on said rollers 61, whereupon by moving said head 67 downwardly the mold is set down onto the conveyor 68 or onto the top one of a stack of flasks 38. With the flask 38 (and squeezed mold 31 therein) thus lowered the cylinder 60 may be actuated to swing the arms 59 out of engagement with the ribs or flanges 39 of said flask 38 whereupon the lowering head 67 is brought back up by cylinder 65 to a position to receive the next completed flask 38 from the flask carrier 36, the arms 59 being swung inwardly by cylinder 60.

The shifting of an empty flask 38 from the pickup head 56 to the flask carrier 36 and the shifting of a flask 38 and squeezed mold 31 therein from said flask carrier 36 to the lowering or stacking head 67 is effected as by means of the fluid cylinder 70 mounted on posts 53. The piston rod 71 of said cylinder 70 is provided with lateral arms 72 and 73 which engage the right hand sides of the respective flasks 38 as viewed in FIG. 1. When the flasks 38 have been shifted toward the left (FIG. 1) by actuation of cylinder 70, and after the flask 38 carried by flask carrier 36 has moved to operating position above the blown mold 31, the cylinder 70 may be restored to its original condition with the flask pusher arms 72 and 73 disposed to engage the next empty flask 38 and the next completed flask 38 with a squeezed mold 31 therein.

(III) Control circuit for automatic operation

It is to be understood that this machine may be rendered fully automatic by judicious placement of limit switches and the like, which switches serve to energize and de-energize solenoid-operated control valves associated with the several fluid cylinders. No attempt has been made herein to show such solenoid operated valves, the piping connections thereof with the respective cylinders, nor the specific locations of the limit and other switches on the machine proper since it is within the realm of persons skilled in the art to install such parts where convenient, and where necessary.

Accordingly, FIG. 7 is a schematic wiring diagram showing how the automatic control circuit components are interconnected to effect desired sequential control of the blow, squeeze, load, and unload operations.

Referring now in detail to FIG. 7, the vertical lines on opposite sides are the power lines L1 and L2, and for convenience in loading the various solenoids, relays, switches, etc. the horizontal lines or levels of said components are numbered 1 through 33, said numbers appearing in parentheses following the respective component identifications.

Across the line at (2) is a disconnect switch DS; at (3) is a "power on" light R; at (4) are ground lights GL; at (5–6) is a "machine on" (5)—"machine stop" (6) switch SW, a machine start switch MS (6), an emergency stop switch ES (6), and a main contactor M–1 (6) which when energized by current flow therethrough closes its normally open switches M–1 (5), M–1 (7), and M–1 in L1 and L2 (11); and at (7) is a "cycle started" light CSR.

Assuming that the following conditions exist at the start of the cycle; namely, (a) A stack of empty flasks 38 is positioned on conveyor 54 under pickup head 56, with said head down and the pickup arms 59 thereof spread apart;

(b) The flask lowering head 67 is likewise down with its arms 59 spread apart;

(c) The sand reservoir 9 is empty and disposed between the blow head 4 and the lowered table 27; and (d) The flask pusher arms 72 and 73 are at their forward position (at the left position, FIG. 1) but no flask 38 disposed in the flask carrier 36; the machine is started by pressing machine start switch MS (6) which energizes the main contactor M–1 (6), thereby closing its aforesaid four switches M–1 (5, 7, 11, 11), the circuit being held through M–1 (7) and bottom machine stop contact (6) of SW.

When the table 27 is down, the bottom contact (13) of LS–3 (7, 13) is closed and when the flask pusher arms 72 and 73 are in forward left position the bottom contact (28) of LS–4 (8, 28) is closed thereby energizing the relays CR–1 (13) and CR–5 (28) to close their normally open switches CR–1 and CR–5 (12), CR–1 (21). This establishes a circuit through solenoid SV–1F (12) associated with the control valve for cylinder 23 and the normally closed latch switch CR–3 (12) of relay CR–3L (15), so as to index the sand reservoir 9 to a position under the sand hopper 6 and the flask carrier 36 under the blow head 4. In one embodiment of the invention such movement takes 3 seconds of a 22 second cycle.

Limit switch LS–1 (14) is closed by the movement of the reservoir 9 to the "fill" position under the sand hopper 6 thereby establishing a circuit through solenoid SV–2 (14) associated with the control valve for cylinder 26, normally closed latch switch CR–3 (14) of relay CR–3L (15), and closed squeeze switch SQ (14). The table 27 is thus raised to perform the squeezing operation on a mold 31 thereon (no mold 31 on table 27 when cycle started). The upward movement of the table 27 starts 3 seconds after initiation of the operation of the machine and continues for 4 seconds thereafter. Installed in the pressure line to said cylinder 25 is a pressure switch PS–1 (17) which, when a predetermined squeeze has been applied on the mold 31, closes a circuit through relay CR–2 (17) which closes its normally open switch CR–2 (15) in circuit with relay CR–3L (15) and energization of the latter opens its latch switches CR–3 (12, 14) to de-energize solenoids SV–1F (12) and SV–2 (14) and thus allow table 27 to descend during the next 3 seconds (from 8th through 10th second after start of cycle).

It is to be noted that when the sand reservoir 9 reaches the "fill" position under hopper 6, the resulting closing of limit switch LS–1 (14) energizes solenoid SV–3R (16) through the then closed switch CR–4 (16) of relay CR–4 (18) and the then closed top contact (16) of limit switch LS–6 (16, 32), CR–4 (16) being closed by energization of relay CR–4 (18) by the down position of the flask set down head 67 closing the top contact (18) of limit switch LS–7 (18, 33), and the top contact (16) of LS–6 (16, 32) being closed by the down position of the flask pickup head 56. Such solenoid SV–3R (16) is associated with the control valve for cylinder 70 and when energized as aforesaid causes actuation of cylinder 70 to return the pusher arms 72 and 73 to the right as viewed in Fig. 1. This takes 3 seconds, from the 4th through the 6th second after starting.

The return of the pusher arms 72 and 73 to the right (Fig. 1) closes the limit switch LS–5 (19) which initiates two movements of the machine components, viz. (a) energization of solenoid SV–4R (19) which actuates cylinder 60 to swing in the pickup arms 59 under the flanges 39 of the top one of the stack of empty flasks 39 and actuates cylinder 58 to raise the flask pickup head 56; and (b) energization of solenoid SV–5R (20) which actuates the cylinder 65 to raise the flask lowering head 67 while the arms 59 are spread apart (leaving a flask 38 on the left hand stack of Fig. 1), said arms having been previously spread apart by the energization of relay CR–4 (18) and closing of its switch CR–4 (31) in circuit with solenoid SV–7F (31) which actuated cylinder 60 to spread apart said arms 59. This takes 3 seconds, from the 7th through the 9th second after starting.

The next movement that occurs at the end of the 10th second when the table 27 has descended as aforesaid is the indexing of the filled sand reservoir 9 to the blow position during the next 3 second period. This is accomplished by energization of solenoid SV–1R (21) associated with the control valve for cylinder 23 through closed switch CR–1 (21) of relay CR–1 (13) and closed limit switch LS–5 (19) which was closed by return of the pusher arms 72 and 73 to the right, FIG. 1.

At the time that the sand reservoir 9 reaches the "blow" position two things occur simultaneously, one being the upward movement of the table 27 to clamp the sand reservoir 9 and mold box 17 between the table 27 and the blow head 4 preparatory to blowing the sand from reservoir 9 into mold box 17 and the other being the unloading of the flask 38 and squeezed mold 31 from flask carrier 36 and loading of an empty flask 38 onto the latter.

When the reservoir 9 reaches the "blow" position the lower contact (23) of limit switch LS–2 (12, 23) is closed whereby solenoid SV–2 (14) for cylinder 25 is energized through now closed switch CR–3 (22), now closed blow switch BL (22) and bottom contact 23 of LS–2 (12, 23). As the pressure builds up in cylinder 25, the pressure switch PS–1 (17) is closed to energize relay CR–2 (17) whereby its switch CR–2 (23) is closed to initiate operation of the blow timer TD–1 (23). Such clamping occurs from the 14th through the 19th second. The timer TD–1 (23) immediately closes its normally open switch TD–1 (24) to energize the blow valve solenoid SV–6 (24) and after a predetermined time of blow, e.g. 1½ sec., the time delay switch TD–1 (24) opens and the exhaust valves 19 are opened. The timer TD–1 (23) also closes TD–1 (25) which energizes the unlatch relay CR–1U (25) which releases the latch so that switch CR–3 (22) may assume its normally open condition to de-energize the solenoid SV–2 (14) whereupon the table 27 may descend to draw the blown mold 31 out of the mold box 17. The table 27 reaches the lowered position at about 22 sec. after starting of the cycle.

The closing of the bottom contact (23) of LS–2 (12, 23) by the reservoir 9 reaching the "blow" position starts another action, as aforesaid, that is, the establishment of a circuit through solenoid SV–3F (26), now closed lower contact (26) of limit switch LS–9 (20, 26), and the limit switches LS–8 (26) and LS–10 (26) which were closed by movement of the respective pickup and set-down heads 56 and 67 to their upper positions level with the flask carrier 36. Solenoid SV–3F (26) when energized, actuates cylinder 70 to move the pusher arms 72 and 73 toward the left so as to shove the flask 38 and squeezed mold 31 therein from carrier 36 to head 67 and to shove an empty flask from head 56 to carrier 36. This occurs during the 14th through 17th seconds after starting. Thereafter, the lower contact (28) of limit switch LS–4 (8, 28) is closed as a consequence of such flask shifting, thus energizing solenoid SV–4F (29) through switch CR–6 (29) of relay CR–6 (32) which is energized by lower contact (32) of limit switch LS–6 (16, 32) closed by pickup head 56 being in up position. Solenoid SV–4F actuates cylinder 58 to lower head 56 and actuates cylinder 60 to spread apart the pickup arms 59. Solenoid SV–5F (30) is similarly energized through switch CR–7 (30) and LS–4 (28), switch CR–7 (30) being closed by energization of relay CR–7 (33) by lower contact (33) of limit switch LS–7 (18, 33) actuated by the up position of the flask lower head 67. The flask 38 with the squeezed mold 31 therein is thus set down on the top of the stack at the left in FIG. 1. Then follows the operations previously described whereby pickup head 56 lifts up the top empty flask 38 and the lowering end moves up leaving the filled flask 38 on the top of the stack.

In the above-described illustrative circuit, the various cylinders are preferably pneumatically actuated and the solenoid valves SV–1 (for control of the indexing cylinder 23), SV–3 (for control of the flask forward feed cylinder 70), SV–4 (for control of parallel connected flask pickup cylinder 58 and associated pickup arm cylinder 60), SV–5 (for control of the flask set down cylinder 65), and SV–7 (for control of the flask release cylinder 60 of lowering head 67) are each of the four-way, double solenoid type, respectively, provided with the solenoids SV–1F (12) and SV–1R (21), SV–3F (26) and SV–3R (16), SV–4F (29) and SV–4R (19), SV–5F (30) and SV–5R (20), and SV–7F (31) and SV–7R (27); the solenoid valve SV–2 (for control of the table raising cylinder 25 by actuation of a pilot valve which operates a "clamp speed" valve (not shown) for flow of air from the pressure source to the cylinder 25) is of the three-way, single solenoid, air restored type provided with the solenoid SV–2 (14); and the solenoid valve SV–6 (for control of the blow valve 5 and exhaust valves 19) is of the four-way, single solenoid, air restored type provided with the solenoid SV–6 (24).

From the foregoing it can be seen that the operation of the machine is substantially completely automatic and does not require any manual manipulations of the flasks 38 or of the mold box 17. The automatic control circuit takes care of the indexing of the sand reservoir 9 for replenishing with sand and for blowing of sand into the mold box 17 and of the indexing of the flask carrier 36 from unload-load position to squeeze position wherein a filled flask 38 is shoved off and stacked and an empty flask 38 from a stack replaces the filled, unloaded flask 38 and wherein the empty flask 38 is moved to squeeze position in which a blown mold 31 is squeezed while encompassed by the empty flask 38.

Notable features of this invention are that the precision made mold box 17 is used in making all of blown molds 31 whereby no sand leakage problem is encountered and that the squeezing operation is performed in flasks 38 that are subjected to rough handling and distortion and thus would be unsuited for use in mold blowing operations. Moreover, the machine is of economical construction in that the same head 4 and table 27 are used for clamping in the blowing operation and for squeezing the blown mold 31 in the squeezing operation.

Broadly stated, the present invention relates to a blow and squeeze molding machine which provides a "blow" station to which a mold box and a flask are alternately transported for forming a blown mold in the mold box and for squeezing the blown mold in the flask, the machine herein being characterized by the provision of a unitary carrier not only for the mold box and for the flask but also for a head against which the blown mold is squeezed while encompassed by the flask. In the specific embodiment herein, the "blow" station is defined by a fixed blow head having a blow valve associated therewithin and a vertically reciprocable pattern plate support table therebeneath between which the mold box and the flask and squeeze head carrier is horizontally reciprocated to position alternately the mold box and the flask and squeeze head under the blow head and above the table. When the mold box is so positioned, the raising of the table effects clamping of the mold box between the blow head and the pattern plate on the table whereupon the blow valve may be actuated to force molding sand into the mold box, and the lowering of the table and the pattern plate draws the blown mold out of the mold box. On the other hand, when the flask and squeeze head is so positioned between the blow head and the table, the raising of the table, the pattern plate, and the blown mold effects squeezing of the blown mold against the squeeze head while encompassed by the flask, and the lowering of the table and the pattern plate draws the pattern on the pattern plate out of the squeezed mold.

The present invention, as previously described, also contemplates a unique mechanism and method for handling empty flasks and flasks with squeezed molds therein. Basically, this mechanism and method involves (a) lifting of the top one of a stack of empty flasks, (b) shifting the lifted flask horizontally onto the flask carrier while the latter is at the load-unload station to one side of the blow and squeeze station of the machine, (c) shifting the flask carrier and the flask carried thereby horizontally to said operating station (as just outlined in the preceding paragraph) for squeezing a blown mold into the flask, (d) shifting the flask carrier and the flask and squeezed mold therein horizontally back to the load-unload station, (e) shifting the flask with the squeezed mold therein horizontally from the flask carrier, and (f) finally lowering the flask with the squeezed mold therein onto the top of a stack of flasks with squeezed molds therein. Preferably the load and unload steps (b) and (e) are performed simultaneously, that is, as the flask with the squeezed mold therein is being shoved off the flask carrier, an empty flask is being shoved onto the flask carrier.

Other modes of applying the principle of the invention may be employed, change being made as regards the details described, provided the features stated in any of the following claims, or the equivalent of such, be employed.

We therefore particularly point out and distinctly claim as our invention:

1. The method of forming a foundry mold which comprises placing a pattern and pattern plate upon a vertically reciprocable table and underneath an open bottom mold box; clamping the pattern plate with the pattern thereon between the mold box and the table by raising the table together with the pattern plate thereon; blowing molding sand into the mold box and against the pattern on the pattern plate to form a blown mold; drawing the blown mold downwardly from the mold box by lowering the table and the pattern plate and blown mold supported on the plate; replacing the mold box with a foundry flask by shifting the mold box and flask horizontally to position the flask above the blown mold; squeezing the blown mold while encircled by the flask against a squeeze head disposed above the flask by again raising the table together with the pattern plate and blown mold thereon; drawing the pattern plate and pattern thereon downwardly from the squeezed mold in the flask by again lowering the table together with the pattern plate and pattern thereon; and replacing the flask with the squeezed mold therein by the mold box by shifting the flask and the mold box horizontally preparatory to repeating the cycle using the same mold box and the same pattern and pattern plate.

2. The method of claim 1 including the step of filling a sand reservoir associated with the mold box with sand from a hopper thereabove during the time that the flask is positioned for squeezing of the blown mold therein.

3. The method of claim 1 wherein the mold box and the flask, together with the squeeze head associated with the flask, are moved simultaneously for replacement of the mold box by the flask and squeeze head and vice-versa.

4. The method of forming a foundry mold which comprises placing a pattern and pattern plate on a reciprocable support to face the open end of a mold box; clamping the pattern plate with the pattern thereon between the mold box and the support by moving the support together with the pattern plate thereon toward the mold box; blowing molding sand into the mold box and against the pattern on the pattern plate to form a blown mold; drawing the blown mold from the mold box by moving the support and the pattern plate and blown mold supported on the plate away from the mold box; replacing the mold box with a foundry flask by shifting the mold box and flask laterally relative to the blown mold to position the flask in aligned, spaced relation to the blown mold; squeezing the blown mold while encircled by the flask against a squeeze head disposed on the opposite side of the flask by moving the support together with the pattern plate and blown mold thereon toward the flask; drawing the pattern plate and pattern thereon from the squeezed mold in the flask by moving the support together with the pattern plate and pattern thereon away from the flask; and replacing the flask with the squeezed mold therein by the mold box by shifting the flask and the mold box laterally preparatory to repeating the cycle using the same mold box and the same pattern and pattern plate.

5. The method of claim 4 including the step of filling a sand reservoir associated with the mold box with sand from a hopper thereabove during the time that the flask is positioned for squeezing of the blown mold therein.

6. The method of claim 4 wherein the mold box and the flask, together with the squeeze head associated with the flask, are moved simultaneously for replacement of the mold box by the flask and squeeze head and vice-versa.

References Cited in the file of this patent

UNITED STATES PATENTS

| | | |
|---|---|---|
| 1,533,220 | Campbell | Apr. 14, 1925 |
| 2,317,574 | Williams | Apr. 27, 1943 |
| 2,588,669 | Taccone | Mar. 11, 1952 |
| 2,866,242 | Miller | Dec. 30, 1958 |